United States Patent
Pankajakshan et al.

(10) Patent No.: US 8,542,677 B1
(45) Date of Patent: *Sep. 24, 2013

(54) SYSTEM AND METHOD FOR ENHANCED DOMAIN AVAILABILITY NOTIFICATION

(71) Applicant: MetroPCS Wireless, Inc., Richardson, TX (US)

(72) Inventors: Bejoy Pankajakshan, Plano, TX (US); Erik K. Kosar, Richardson, TX (US); Robert Wondoloski, Richardson, TX (US)

(73) Assignee: MetroPCS Wireless, Inc., Richardson, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/758,564

(22) Filed: Feb. 4, 2013

Related U.S. Application Data

(63) Continuation of application No. 13/470,939, filed on May 14, 2012, now Pat. No. 8,428,052.

(51) Int. Cl.
*H04L 12/66* (2006.01)

(52) U.S. Cl.
USPC ........................................... 370/352

(58) Field of Classification Search
None
See application file for complete search history.

*Primary Examiner* — Chi Pham
*Assistant Examiner* — Kouroush Mohebbi
(74) *Attorney, Agent, or Firm* — Howison & Arnott, L.L.P.

(57) ABSTRACT

A method for providing IP network information to a network service provider receives at a voice call continuity application server an indication that a call to a mobile device has been dropped by the IP network and transmits information relating to the dropped call from the voice call continuity application server to a monitoring system of the network service provider.

22 Claims, 2 Drawing Sheets

SYSTEM AND METHOD FOR ENHANCED DOMAIN AVAILABILITY NOTIFICATION

CROSS-REFERENCE TO RELATED APPLICATIONS

This application is a continuation of U.S. patent application Ser. No. 13/470,939, filed May 14, 2012, entitled SYSTEM AND METHOD FOR ENHANCED DOMAIN AVAILABILITY NOTIFICATION, now U.S. Pat. No. 8,428,052, issued Apr. 23, 2013, the specification of which is incorporated herein in its entirety.

TECHNICAL FIELD

The present invention relates to the provision of network availability information, and more particularly to the use of a notification provided from a Voice Call Continuity application server within the IMS domain to provide realtime information with respect to network availability.

BACKGROUND

The Voice Call Continuity (VCC) specification describes how a voice call can be maintained as a mobile device moves between a circuit switch network and a packet switch network. Within a standard VOIP call, the operation of the mobile devices are controlled by the IP infrastructure. However, within the VCC specification, calls to and from a mobile device in a circuit switch domain may become attached and detached from the IP domain. As the handset becomes attached and detached from wireless access points, such as a Wi-Fi hotspot, a notification is provided of the radio conditions to a VCC platform within the network from the handset. This enables circuit switch and IP switch callings to be originated and terminated in a transparent manner such that the call path is automatically transferred between domains. The points at which these calls become connected and disconnected would be of interest to a network service provider because they provide indications of dead spots or weaknesses within the network. Some manner for providing realtime information with respect to this information that is causing the mobile device to switch between the IP network and circuit switch network would be of great benefit to the service provider in the control and operation of their networks.

SUMMARY

The present invention as disclosed and described herein, in one aspect thereof, comprises a method for providing IP network information to a network service provider receives at a voice call continuity application server an indication that a call to a mobile device has been dropped by the IP network and transmits information relating to the dropped call from the voice call continuity application server to a monitoring system of the network service provider.

BRIEF DESCRIPTION OF THE DRAWINGS

For a more complete understanding, reference is now made to the following description taken in conjunction with the accompanying Drawings in which.

DETAILED DESCRIPTION

Figure 1:
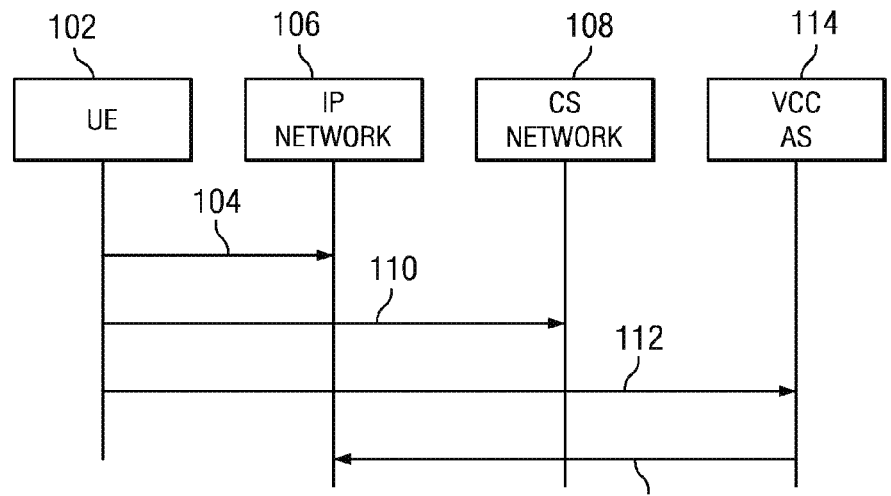
FIG. 1 illustrates the manner in which notifications are presently provided when a user equipment is dropped from an IP network.

Referring now to the drawings, wherein like reference numbers are used herein to designate like elements throughout, the various views and embodiments of a system and method for enhanced domain availability notification are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Referring now to the drawings, and more particularly to FIG. 1, there is illustrated the various communications links and messages established responsive to the dropping of a Voice over IP call by an IP network. The user equipment 102 initially establishes the basis for an IP connection with the IP network 106 over a link 104. Additionally, the user equipment 102 establishes the basis for a connection with the circuit switch network 108 over a link 110. Calls will then be carried out over the IP network 106 until a problem with the IP network connection is detected. Upon the necessity for dropping an IP based call, the user equipment 102 transmits an SMS message 112 to the Voice Call Continuity application server 114 to notify the application server of the necessity to change to a circuit switched connection. The VCC application server 114 transmits information 116 back to the IP network 106 enabling the handoff of the call from the IP network 106 to the circuit switch network 108 in a seamless fashion.

Figure 2:
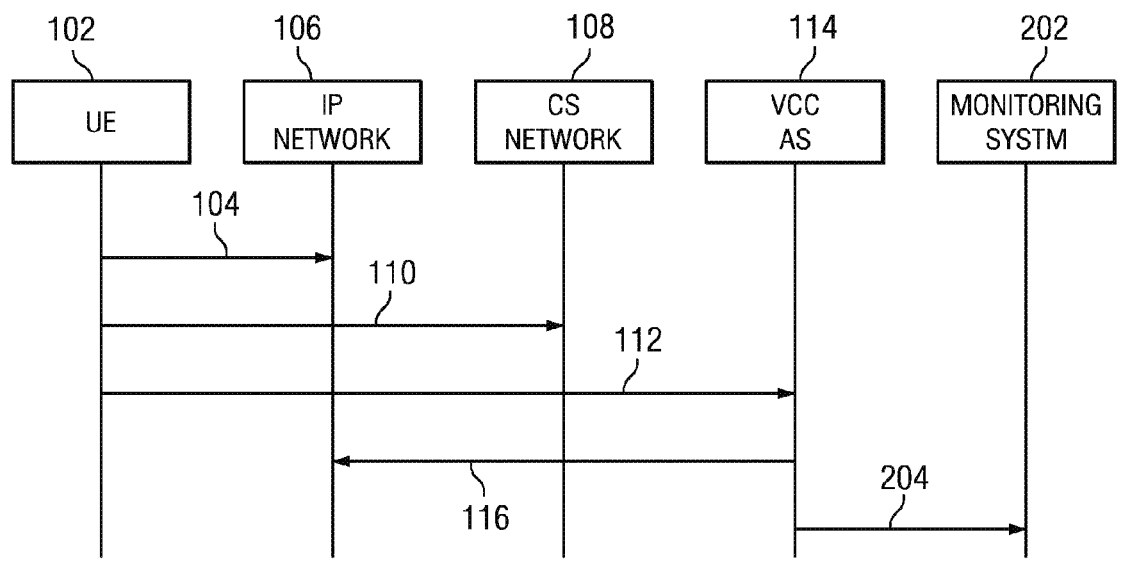
FIG. 2 is a flow diagram describing the manner in which location information may be automatically exported to a monitoring system responsive to a dropped IP call.

Referring now to FIG. 2, there is illustrated the manner in which additional information may be provided to a service provider monitoring system 202 that will enable the information provided by the user equipment 102 to be provided to the monitoring system 202 in realtime and provide network coverage information that may be utilized by a system provider to improve network performance. The user equipment 102 establishes an IP link 104 with the IP network 106 and provides the information necessary for establishing the circuit switched link 110 with the circuit switch network 108. The user equipment 102 may comprise a mobile telephone, personal data assistant, tablet computer, portable laptop computer or any other type of portable communications device. Upon occurrence of a situation causing the IP based call to be dropped by the user equipment 102, information 112 is transmitted to the Voice Call Continuity application server 114 indicating dropping of the call by the IP network 106. The VCC application server 114 transmits information 116 back to the IP network 106 providing for the handoff of the call between the IP network 106 and the circuit switched network 108. Additionally, the VCC application server 114 will transmit location information 204 relating to the user equipment 102 to the monitoring system 202 such that this information may be used by the service provider to provide realtime information with respect to the network coverage areas associated with the user equipment 102. The service provider may then use the information to improve and update network performance.

Figure 3:
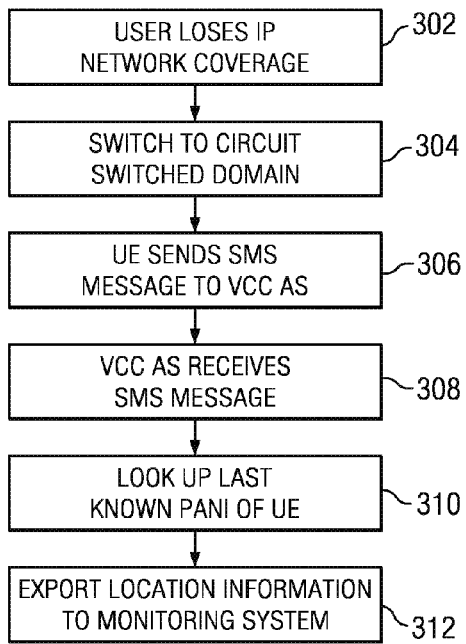
FIG. 3 illustrates the communications links established when an IP call is dropped according to the method of FIG. 2.

Referring now to FIG. 3, there is illustrated a flow diagram describing the manner in which the remote monitoring system is provided with information related to the calls being dropped by the IP network. Initially, the user equipment 102 loses IP network coverage at a particular location at step 302. Responsive to the loss of the IP network coverage, the user equipment 102 is switched to the circuit switched domain at step 304. The user equipment 102 sends an SMS message to the VCC application server at step 306 notifying the VCC application server 114 of the switch to the circuit switched domain. The VCC application server 114 receives at step 308 the SMS message from the user equipment 102 and determines the last known PANI header of the user equipment at step 310. Utilizing the location information stored within the last known PANI header at the VCC application server 114, the location information within the PANI header is exported at step 312 to the network provider monitoring system and this information may then be used by the network provider to track network coverage areas and improve or update network performance.

Figure 4:
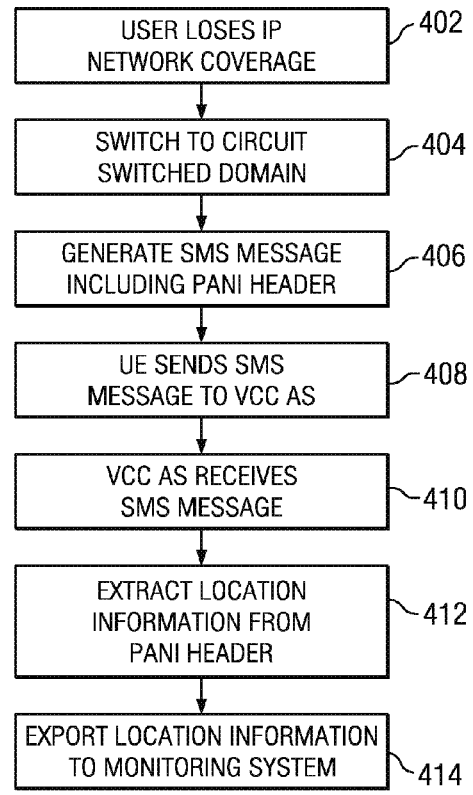
FIG. 4 more particularly illustrates the manner for providing an automatic notification to a monitoring system responsive to the dropping of an IP call.
Figure 5:
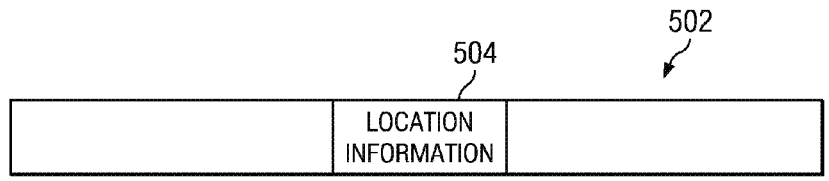
FIG. 5 illustrates the manner for including location information within a PANI header.

Referring now to FIG. 4, there is provided a more detailed description of the manner for notifying the remote monitoring system when an IP based call is dropped. When the user loses IP network coverage at step 402, the user equipment 102 switches to the client domain at step 404. The user equipment 102 generates an SMS message including the PANI header from the user equipment at step 406. The configuration of the PANI header is more particularly illustrated in FIG. 5, which shows the PANI header 502 having the location information 504 embedded someplace therein. The user equipment 102 transmits the SMS message at step 408 to the VCC application server 114. The VCC application server 114 receives the SMS message at step 410 and extracts the location information at step 412 from the PANI header 502 within the SMS message. The SMS message can additionally include RF related information that will aid the service provider in optimization of the network. For example, signal strength that was reported to the user equipment 102 immediately before the call was dropped or neighboring cell information. This extracted location information 504 from the PANI header 502 is exported at step 414 to the remote monitoring system 202 of the system provider. The system provider may use this information with respect to the locations at which IP based calls are being dropped to control and improve various system operations within their IP network.

It will be appreciated by those skilled in the art having the benefit of this disclosure that this system and method for enhanced domain availability notification provides realtime network information which may be valuable to a network service provider. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A method for providing IP network information to a network service provider, comprising:

receiving at a voice call continuity application server a first message including an indication that a call to a mobile device has been dropped by an IP network; and accessing a most recently received second message containing geographic update information of a plurality of periodically received messages containing geographic update information, the second message including a geographic location of the mobile device;

extracting the geographic location of the mobile device from the most recently received second message responsive to the first message;

transmitting the geographic location relating to the dropped call from the voice call continuity application server to a monitoring server of the network service provider that tracks geographic locations at which IP network calls are dropped.

2. The method of claim 1, further including the step of altering operation of the IP network responsive to the geographic location relating the dropped call transmitted to the monitoring server.

3. The method of claim 1, wherein the first message comprises a text message.

4. The method of claim 1, wherein the second message comprises a SIP message.

5. The method of claim 1 further comprising:

transmitting from the mobile device the plurality of periodically received second messages to the voice call continuity application server each containing location information for the mobile device; and transmitting the first message to the voice call continuity application server from the mobile device indicating the call has been dropped by the IP network.

6. The method of claim 1, wherein the step of transmitting the first message further comprises the step of detecting dropping of the call by the IP network.

7. A method for providing IP network information to a network service provider, comprising:

transmitting from a mobile device a plurality of headers to a voice call continuity application server each header containing location information defining a geographic location for the mobile device;

transmitting a message to the voice call continuity application server from the mobile device indicating a call has been dropped by an IP network; and extracting location information defining the geographic location from a most recent header received at the voice call continuity application server responsive to the message;

transmitting the location information defining the geographic location from the most recent header relating to the dropped call from the voice call continuity application server to a monitoring server of the network service provider that tracks geographic locations at which IP network calls are dropped responsive to the message and the location information defining the geographic location in the most recent header.

8. The method of claim 7, further including the step of altering the operation of the IP network responsive to the information relating the dropped call transmitted to the monitoring server.

9. The method of claim 7, wherein the step of transmitting the message further comprises receiving the information at the voice call continuity application server within the header.

10. The method of claim 7, wherein the step of transmitting location information further comprises:

extracting the location information from the most recent header received at the voice call continuity application server responsive to the message;

transmitting the extracted location information from the voice call continuity application server to the monitoring system of the network service provider.

11. The method of claim 7, wherein the step of transmitting the message further comprises the step of detecting the dropping of the call by the IP network.

12. The method of claim 7, wherein the header comprises a header of a SIP message.

13. The method of claim 7, wherein the message comprises a text message.

14. A method for providing IP network information to a network service provider, comprising:

transmitting from a mobile device a plurality of first messages to a voice call continuity application server each first message containing location information defining a geographic location for the mobile device;

transmitting a second message to the voice call continuity application server from the mobile device indicating a call has been dropped by an IP network;

extracting the location information defining the geographic location from a most recent first message received at the voice call continuity application server responsive to the second message;

transmitting the extracted location information defining the geographic location from the most recent first message relating to the dropped call from the voice call continuity application server to a monitoring server of the network service provider that tracks geographic locations at which IP network calls are dropped responsive to the first message; and altering operation of the IP network responsive to the information relating the dropped call transmitted to the monitoring server.

15. The method of claim 14, wherein the step of receiving further comprises receiving the information at the voice call continuity application server within the first message.

16. The method of claim 14, wherein the step of transmitting the second message further comprises the step of detecting the dropping of the call by the IP network.

17. A system for providing IP network information to a network service provider, comprising:

a voice call continuity application server for receiving a first message that a call to a mobile device has been dropped by an IP network;

wherein the voice call continuity application server further transmits information relating to the dropped call to a monitoring system of the network service provider responsive to an the indication that the call has been dropped;

wherein the voice call continuity application server accesses a most recently reviewed second message of a plurality of previously received second message, the second messages each including a geographic location of the mobile device; and the voice call continuity application server further extracts the geographic locations of the mobile device from the most recently received second message responsive to the first message.

18. The system of claim 17, further including an IP network service provider server for altering an operation of the IP network responsive to the information relating the dropped call transmitted to the monitoring system.

19. The system of claim 17, wherein the first message comprises a text message.

20. The system of claim 17, wherein the second message comprises a SIP message.

21. The system of claim 17 further comprising:

a mobile device client for transmitting from the mobile device the plurality of second messages to the voice call continuity application server each containing the geographic location for the mobile device; and wherein the mobile device client further transmits the first message to the voice call continuity application server from the mobile device indicating the call has been dropped by the IP network.

22. The system of claim 21, wherein the mobile device client further detects the dropping of the call by the IP network.

* * * * *